Sept. 24, 1968 C. V. FOGELBERG ETAL 3,402,431
SECTIONAL MOLD MOUNTS
Filed Sept. 12, 1966 2 Sheets-Sheet 1
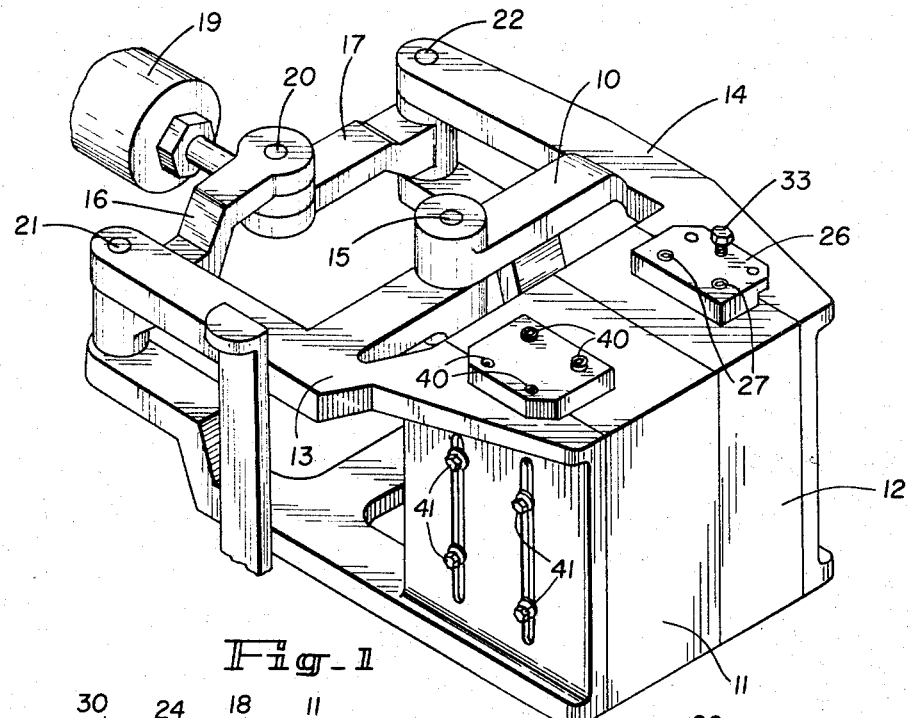
Fig-1
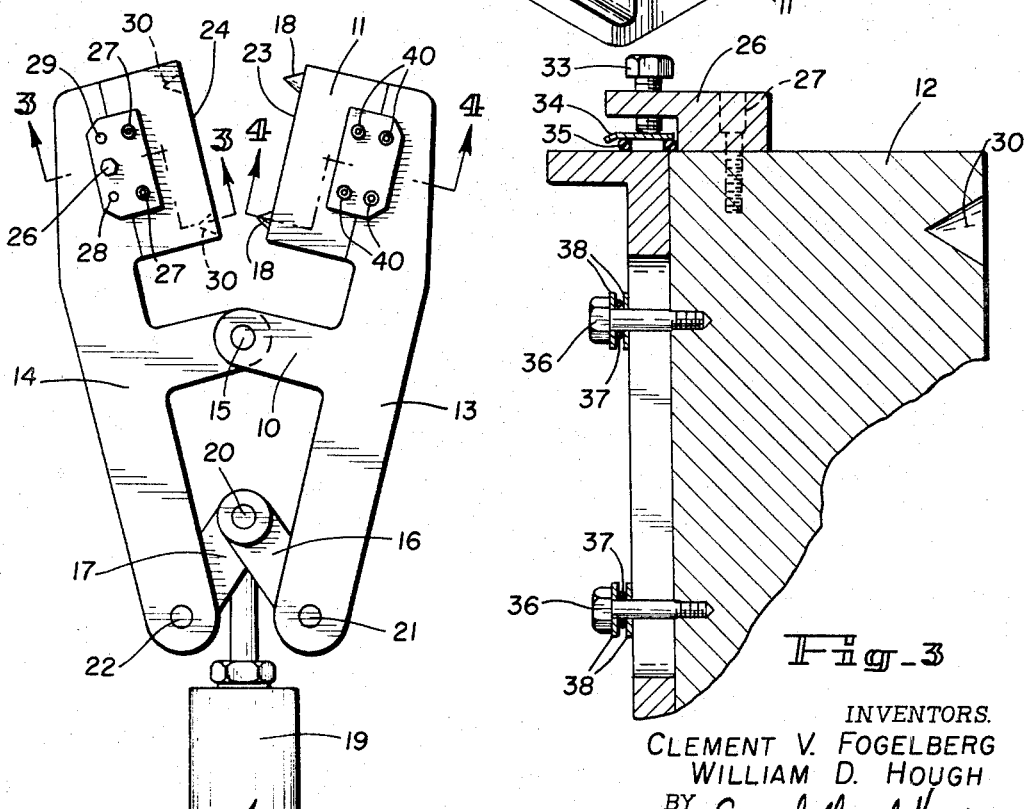
Fig-2
Fig-3
INVENTORS.
CLEMENT V. FOGELBERG
WILLIAM D. HOUGH
BY Campbell and Harris
by Thomas W. O'Rourke
ATTORNEYS Sept. 24, 1968   C. V. FOGELBERG ET AL   3,402,431
SECTIONAL MOLD MOUNTS Filed Sept. 12, 1966   2 Sheets-Sheet 2

INVENTORS.
CLEMENT V. FOGELBERG
WILLIAM D. HOUGH
BY

ATTORNEYS 3,402,431
SECTIONAL MOLD MOUNTS
Clement V. Fogelberg, Boulder, and William D. Hough, Arvada, Colo., assignors to Ball Brothers Company Incorporated, Muncie, Ind., a corporation of Indiana
Filed Sept. 12, 1966, Ser. No. 578,813
6 Claims. (Cl. 18—43)

ABSTRACT OF THE DISCLOSURE

Apparatus for mounting and aligning a sectional mold wherein at least one mold section is fixedly mounted and the remaining mold sections are resiliently mounted upon opening and closing mechanism, including alignment means to urge the resiliently mounted sections into proper alignment with the fixedly attached mold section upon closing.

---

This invention concerns a new and improved apparatus for rapidly mounting sections of a multisectioned mold which ensure accurate alignment of the closed sections. More specifically, this invention concerns an apparatus for providing accurate alignment of the sections of a multisectioned mold by resiliently mounting one or more sections of the mold and providing guide means to urge the sections into proper alignment upon closing.

In forming articles, it is quite common to use a sectioned hollow mold in order to permit removal of the articles. Die casting and blow molding are typical examples of forming methods using such an expedient. To be acceptable, the mold sections must be accurately and firmly fitted together during formation of the article. Not only must the mating surfaces of the mold sections form a tight seal to preclude escape of material being molded, but an essentially continuous surface must also be defined in the areas at which the mating surfaces form the molding surfaces of the mold cavity. Any discontinuations or misalignments will mar the surface of the molded article. This is of particular concern in the blow molding of bottles which must be aesthetically pleasing as well as functional. Blow molding presents stringent requirements for accurate sealing between the mold sections because of the substantial pressure with which the yielding plastic material is contacted with the mold during the blowing operation.

Since the requirements of blow molding are so stringent, and since the instant invention has great utility in this field, the invention will, for the most part, be described in the terms of use in blow molding. However, those skilled in the art will readily recognize parallel uses in other areas in which sectional molds are used.

The classical blow molding sectional mold is one which is vertically and substantially symmetrically divided into two sections. To form a blow molded article, a parison of heated plastic is extruded between the open mold sections, the sections are closed over and around the parison, and a fluid such as air is injected into the parison under pressure to expand the parison into intimate contact with the interior mold surfaces. The thus formed article is quickly cooled by the mold surfaces which function as a heat sink. Removal of the article is accomplished by merely opening the mold sections to allow the article to drop out. Another parison is then introduced to repeat the molding cycle.

It will be noted that movement of the mold sections is such as to require the two extremes of the components of a given unit of work in the course of the molding cycle. A force of only moderate magnitude is needed to move the mold sections a substantial distance, i.e., from adjacent one another to the open position, and back. However, once the mold sections abut one another, they need be moved only a short distance but under great force to provide sealing of the mating surfaces of the mold sections. Obviously, ordinary hydraulic or pneumatic equipment operating with a fixed mechanical advantage will require both a long stroke to move the mold sections and a large bore to provide adequate sealing of the mold sections. Such equipment is wasteful in that it is capable of performing much more work than is required.

Fortunately, equipment capable of only the work required can be used if connected to the mold sections through a closing mechanism including linkage which correctly modifies the work components, i.e., force and distance, for the appropriate portions of the molding cycle. One such linkage having these favorable attributes is the toggle linkage. The advantages of this linkage will be more fully considered in the discussion of the drawings.

While the toggle linkage has favorable characteristics concerning the force and distance requirements of the molding cycle, the linkage also has some complicating traits. For instance, toggle linkage imparts not only a linear movement to the mold sections, but also produces angular rotation thereof. Thus, the mating surfaces of the mold sections are in complementary position, i.e., parallel in most instances, during only one position in the travel of toggle linkage. Angular rotation can be minimized by appropriate design factors, but will always be present to a greater or lesser extent. Also, the design factors which minimize angular rotation may introduce yet other problems such as undesirably long lever arms.

The need for accurate mating of the mold sections, while using a mechanism that angularly rotates the mold sections relative to one another, was heretofore met by precision design and meticulous adjustment. This approach has generally been employed to align mold sections. However, with the increasing use of equipment such as that described in Fogelberg and Hough, U.S. patents, Number 3,257,687 and Number 3,243,847, this approach is no longer satisfactory. The apparatus described in these patents incorporates flexibility and versatility which permit production of many different items by merely changing the mold sections and programing on a given piece of apparatus. Therefore, a great need exists for some means to facilitate quick and easy changing of the mold sections. Obviously, extensive adjustment to obtain precise closing of the mold sections is not acceptable if the mold sections may again be changed after a relatively short run.

Instead of designing a complete unit of equipment for production of a given unit, and using it only for that unit, it is becoming more popular to utilize flexible apparatus such as that described in the above-mentioned patents. If the precision approach were to be maintained, each mold used on a given machine would have to have identical mounting, closing position and geometry.

It is therefore an object of this invention to provide an apparatus which permits mold sections to be rapidly and easily mounted and demounted.

Another object of this invention is to provide apparatus which permits mold sections to accurately align upon closing with only "eyeball" adjustment of the indivual sections upon mounting thereof.

Yet another object of this invention is to provide an apparatus which will compensate for angular variations in the positions of different mold sections at the point of closure.

Still another object of this invention is to provide an apparatus for insuring proper sealing of complementary mold sections when closed.

The above and other objects and advantages of the instant invention will be apparent after consideration of the description and drawings.

According to the instant invention, the above and other objects and advantages are obtained by mounting the mold sections with at least one section being fixedly secured to the closing mechanism and the remaining mold sections being resiliently mounted on the closing mechanism. Also included as a feature of this invention is alignment means to properly position the resiliently mounted sections relative to the fixedly mounted section by utilizing the force with which the sections are closed. Thus, the fixedly mounted section serves as an absolute index for adjustment of the various equipment which must be coordinated relative to the mold position. The resiliently mounted mold sections readily accommodate and correct any minor inaccuracies in mating between these sections and the fixedly mounted section without altering the time and space relationship between the opening-closing cycle of the mold and the overall operation of the blow molding equipment. Accommodation of the resiliency mounted mold section to the fixedly mounted mold may be laterally, vertically, or angularly along or around any of the three axes of the resiliently mounted mold, or a combination of any of these factors.

The fixedly mounted mold section can be mounted by any conventional reversible attachment means. For instance, it can be bolted, wedged, pinned, or otherwise secured to the closing mechanism. Bolting of the fixedly mounted section to the closing mechanism is preferred for simplicity and strength.

Once secured in place, the fixedly mounted section presents a constant reference for such dependent relative functions as parison placement and blow stick or blow pin placement. These and other functions need only be adjusted relative to the fixedly mounted mold section. The resiliently mounted mold sections will, with a rough initial adjustment, conform to the orientation of the fixedly mounted mold section when the mold is closed.

The resiliently mounted sections of the mold are mounted in such a manner as to normally hold the sections in a nominal given unstressed position relative to the closure mechanism. However, when a force is applied to a resiliently mounted mold section while in contact with the fixedly mounted section, the resilient mounting compensates for and corrects misalignment between the two. Preferably, the resilient mounting means is merely elastomer inserts which serve as the primary mechanical link between the mold section and the closing mechanism. Simple rubber O-rings and/or oversized rubber bands are advantageously used for this purpose. High temperature elastomers such as certain of the silicon rubbers are preferred. Other resilient mounting means may be used, but, for the most part, the other means are more complicated and have only marginal operating advantages over the simple elastomer insert arrangement.

Other operable resilient mounting means include universal joint or ball joint connectors which are loaded by springs or other means into a substantially constant unstressed position. It is necessary that the resilient mounting means provide a substantially constant unstressed position to permit use of simple and foolproof alignment means.

The alignment means is preferably a simple pin and hole arrangement to guide the mold sections into proper alignment as the sections are closed. Tapered pins and holes of circular cross section are advantageously used. Two or more tapered pins and complementary holes are ideally used to guide the mold sections together. Since the smaller cross section portion of the pin will first associate with the greatest cross section of the hole, misalignment of the mold sections will not frustrate the pin and hole alignment means as long as the misalignment is not such that the pin will not initially enter the hole when closing. Mere "eyeball" alignment of the mold sections when mounting the mold section will bring the alignment within these tolerances. Once the pins enter the holes, the taper will serve as an inclined surface producing forces which urge the mold sections into proper alignment. This force will distort the resilient mounting means and the mold sections will align properly. A single pin and complementary hole arrangement of other than circular cross sections may also be used at the expense of much higher torque forces.

A more detailed understanding of the invention will be had upon consideration of the drawings which show a preferred embodiment of the invention in which:

FIGURE 1 is a perspective view of the apparatus of the instant invention in which the mold sections are mounted on a toggle closing mechanism;

FIGURE 2 is a top view of the apparatus in an open position;

FIGURE 3 is a partial sectional view of the resiliently mounted mold section along line A—A;

Figures 4, 5:
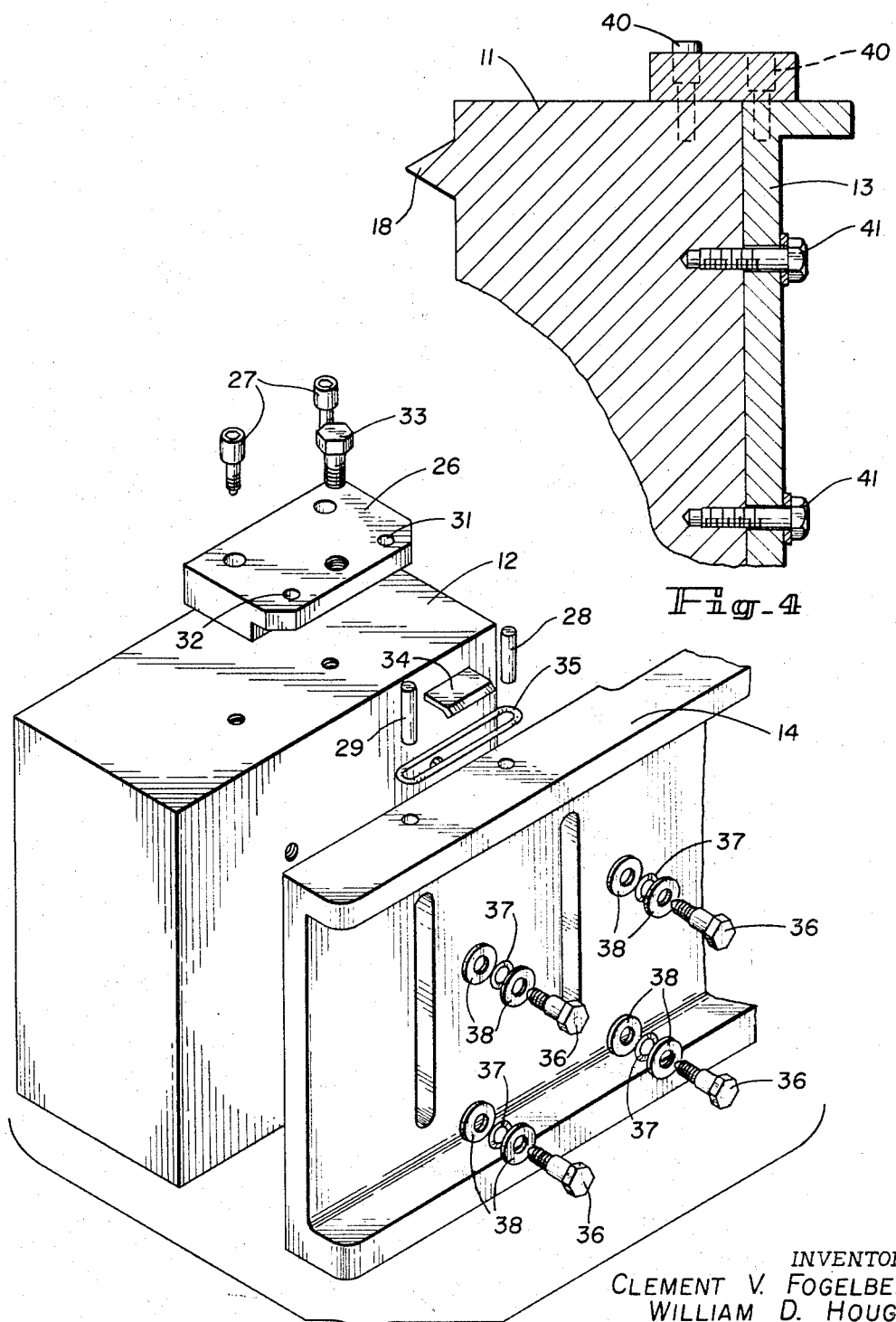
FIGURE 4 is a partial sectional view of the fixedly mounted mold section along line B—B.
FIGURE 5 is an exploded view of the resiliently mounted mold section.

FIGURE 1 illustrates the general relationship between toggle closing mechanism 10, fixedly mounted mold section 11, and resiliently mounted mold section 12. The manner in which the illustrated apparatus functions in a complete blow molding apparatus will be apparent from the aforementioned U.S. patents, Number 3,257,687 and Number 3,243,847.

Operation of closing mechanism 10 will be apparent from FIGURE 2. Support arms 13 and 14 are joined by pivot pin 15. Actuating arms 16 and 17 link support arms 13 and 14 to prime mover 19 by means of pivot pins 20, 21 and 22. Fixedly mounted mold section 11 is attached to the outer end of support arm 13 and resiliently mounted mold section 12 is attached to the outer end of support arm 14. Obviously, a given amount of movement of prime mover 19 will produce a greater movement of mold sections 11 and 12 when the enclosed angle between actuating arms 16 and 17 is smaller.

As actuating arms 16 and 17 approach a parallel relationship, the movement of support arms 13 and 14 display less movement per unit movement of prime mover 19. Thus, mold sections 11 and 12 move rapidly from the open position, for instance, to approaching the closed position as prime mover 19 moves actuating arms 16 and 17 into a position approaching longitudinal alignment. Since mechanical advantage is inversely related to the distance, mold sections 11 and 12 move per unit movement of prime mover 19, it will recognize that the toggle linkage ideally provides the force-distance requirements as discussed above. Upon initiating the closing movement, a given increment of movement of prime mover 19 provides substantial movement of mold sections 11 and 12. However, when the mold sections 11 and 12 abut one another during the closing movement, movement of prime mover 19 produces greatly diminished movement of mold sections 11 and 12. The diminished movement of mold sections 11 and 12 permits much greater forces to be generated and enables the mold sections 11 and 12 to be forceably joined.

It will also be evident from FIGURE 2 that mating surfaces 23 and 24 of mold sections 11 and 12 are not in proper alignment when in the opened position. If this angular misalignment persists through contact of mating surfaces 23 and 24, forces will, of course, be generated, which tend to correct the misalignment. In conventional rigidly mounted mold sections, these forces effectuate correction, if at all, only by inducing strains in the mounting. Pins 18 cooperate with holes 30 to generate corrective forces for transverse or longitudinal misalignment.

FIGURES 3 and 5 illustrate applicant's mounting means which compensates for minor misalignments such as those possibly caused by the above-discussed alignment idiosyncrasies of toggle closing mechanism 10. With particular regard to FIGURE 3, attachment support 26 is secured to mold section 12 by securing means such as cap screws 27.

Guide pins 28 and 29 which are mountable on support arm 14 engage holes 31 and 32 on the attachment support 26. Thus, mold section 12 can be placed on support arm 14 by merely placing the attachment support 26 over guide pins 28 and 29 thereby hanging the mold section 12 on support arm 14 as will be apparent from FIGURE 5. Adjustment bolt 33 is threaded through attachment support 26 and bears upon support plate 34. Resilient support means 35 is interposed between support plate and support arm 14. The height of mold section 12 relative to support arm 14 can be regulated by adjustment bolt 33. Since guide pins 28 and 29 are substantially undersized relative to holes 31 and 32, resilient support means 35 may be deformed along or around any of the three axes by an appropriate force. However, since any such deformation of resilient support means 35 is reversible, mold section is provided with a nominal fixed position relative to support arm 14.

Additional resilient attachment is provided by bolts 36 which secure mold section 12 to support arm 14 through resilient member 37. In the preferred embodiment, resilient members 37 are elastomeric O-rings which are sandwiched between oversized washers 38.

Thus, though mold section 12 is securely mounted and nominally located relative to support arm 14, mold section 12 in effect floats upon resilient support means 35 and resilient members 37.

As shown in FIGURE 4, fixedly mounted mold section 11 is conventionally and rigidly mounted on support arm 13 by means of cap screws 40. Bolts 41 are also employed to secure mold section 11 to support arm 13.

Though the above-discussed apparatus and method are primarily useful for facilitating rapid changes of mold sections on versatile machinery, it will be recognized that substantial advantages will also be realized in situations involving more or less permanent mounting of the mold sections. These advantages include ease of maintaining register of the various functions of the apparatus and avoidance of equipment strains resulting from minor misalignments.

From the above description, it is apparent that various modifications in the procedures and apparatus disclosed herein may be made while remaining within the scope of the invention. Therefore, the invention is not intended to be limited by the specific procedures or apparatus set forth except as may be required by the following claims.

What is claimed is:

1. Apparatus for aligning a sectional mold comprising rigid mounting means for fixedly attaching at least one mold section to an opening and closing means, resilient mounting means for resiliently attaching the remaining mold sections, but at least one mold section, to said opening and closing means and alignment means for urging said resiliently mounted sections into proper alignment with said fixedly attached mold section upon closing of the sectional mold whereby misalignment between the mold sections is nondestructively accommodated and corrected by said resilient mounting means.

2. Apparatus as set forth in claim 1 including adjustment means for conveniently altering the vertical position of said resiliently mounted mold section relative to said fixedly attached mold section.

3. Apparatus as set forth in claim 1 wherein said resilient mounting means is elastomeric O-rings interposed between said opening and closing means and said resiliently mounted mold sections.

4. Apparatus as set forth in claim 3 wherein said alignment means is a plurality of tapered pins on one of two adjoining mold sections and complementary tapered holes in the other adjoining mold section.

5. Apparatus as set forth in claim 4 wherein adjustment means is provided to vertically alter the relative position of said resiliently mounted mold section relative to said fixedly mounted mold section.

6. A self-aligning sectional mold comprising at least one mold section fixedly bolted to an opening and closing means, rubber O-rings interposed between said opening and closing means and said remaining mold sections, said rubber O-rings forming a floating connection between said opening and closing means and said remaining mold sections, at least one of each two adjoining mold sections being mounted by means of said rubber O-rings and one of said adjoining mold sections having tapered pins cooperating with tapered holes in the adjoining mold section to urge said mold sections into proper alignment upon closing, whereby misalignment between the mold sections is nondestructively accommodated by said rubber O-rings.

References Cited

UNITED STATES PATENTS

| | | | |
|---|---|---|---|
| 2,770,011 | 11/1956 | Kelly | 18—42 X |
| 3,031,561 | 4/1962 | Schaffer | 18—36 |
| 3,070,860 | 1/1963 | Fanwick | 18—42 X |
| 3,315,318 | 4/1967 | Halward | 18—42 X |

WILBUR L. McBAY, *Primary Examiner.*